(No Model.)
R. HERMANCE.
Street Car Starter.
No. 241,657. Patented May 17, 1881.
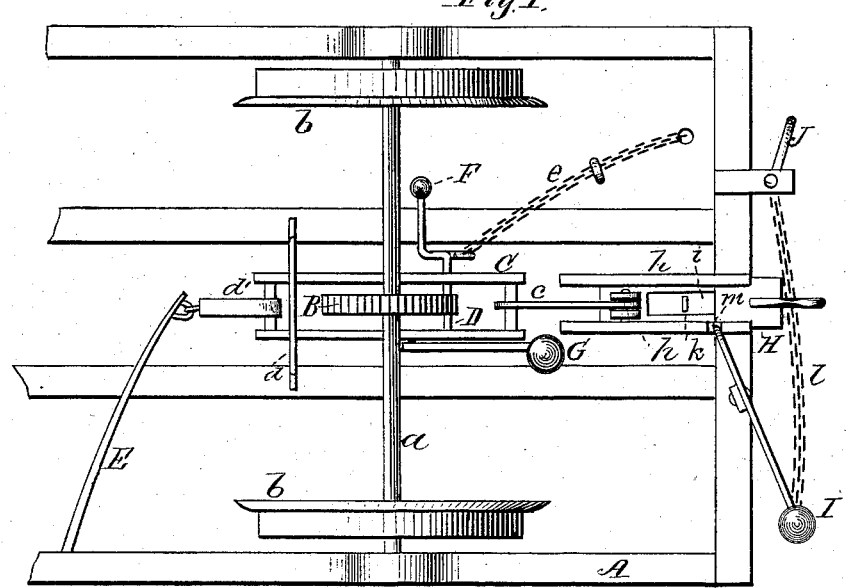
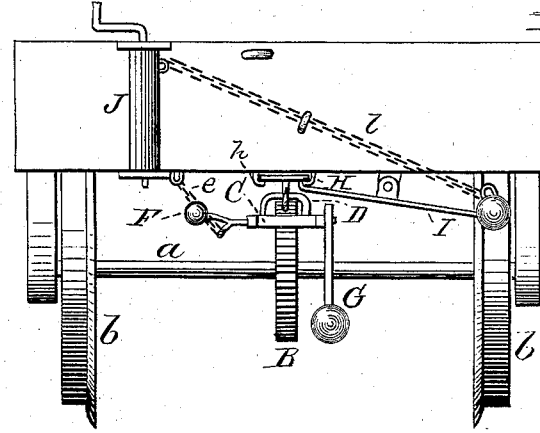
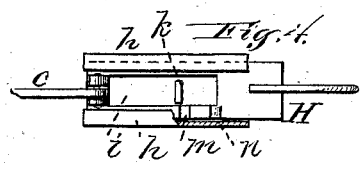
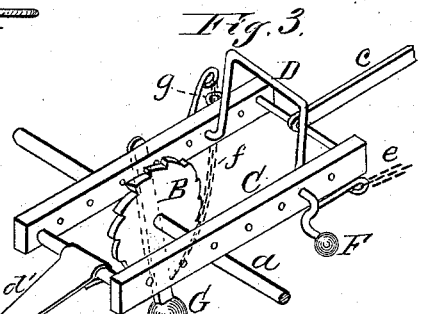
Witnesses:
H. C. McArthur
W. C. Shaffer
Inventor:
Robert Hermance.
per Chas. H. Fowler,
Attorney.

UNITED STATES PATENT OFFICE.

ROBERT HERMANCE, OF FORT MILLER, NEW YORK.

STREET-CAR STARTER.

SPECIFICATION forming part of Letters Patent No. 241,657, dated May 17, 1881.

Application filed February 18, 1881. (No model.)

*To all whom it may concern:*

Be it known that I, ROBERT HERMANCE, a citizen of the United States, residing at Fort Miller, in the county of Washington and State of New York, have invented certain new and useful Improvements in Street-Car Starters; and I do hereby declare that the following is a full, clear, and exact description of the same, reference being had to the annexed drawings, making a part of this specification, and to the letters and figures of reference marked thereon.

Figure 1 is an under-side plan view of my invention; Fig. 2, an end view of the same; Fig. 3, a detail view, in perspective, of a portion of the operating mechanism; and Fig. 4, a detail view of the draw-bar.

The present invention has reference to certain new and useful improvements in that class of street-car starters in which a ratchet-wheel is connected to the axle of the wheels, and by suitable mechanism and arrangement of levers working in conjunction with the draft-bar causes a pawl or other similar device to be engaged with the ratchet-wheel to start the car, and afterward to release the pawl or disengage it with said ratchet-wheel after the car is in motion.

The object of the invention is to construct and arrange the operating mechanism whereby the friction usually occasioned by the working of the car-starter is greatly diminished, as well as the noise and unpleasant racket resulting from the various levers, arms, wheels, and other connections employed in operating the starter.

A further object of the invention is to dispense with the usual coiled springs employed for causing the pawl or other like device to engage with the ratchet-wheel, thus securing a more perfect operation of the starter with less liability of its getting out of order.

These various objects above enumerated I successfully attain by the construction and arrangement shown in the accompanying drawings and hereinafter described.

In the drawings, A represents the usual truck or platform of a car, or the frame-work thereof, to which the axle *a* and wheels *b* are connected in the ordinary manner.

To the axle *a* is rigidly connected a ratchet-wheel, B, of the required size.

A rectangular frame, C, is located over the axle *a* and ratchet-wheel B, the latter projecting above the upper portion of said frame, so that a U-shaped pawl, D, will engage with the teeth on the ratchet-wheel. This frame C, at its rear end, is connected in any suitable manner to a flat spring-bar, E, one end of said bar being connected to the side of the car frame or platform A, while the other end is connected to the suspended frame C. This single spring E takes the starter back ready for operation the moment the car stops. The springs heretofore employed for the purpose were coiled springs, which would easily get out of order, and their constant vibration, caused by the jarring motion of the car, made a very disagreeable noise. These coiled or spiral springs are entirely dispensed with, and in place thereof a simple spring-bar, E, substituted, which possesses increased strength and durability, and is more certain in its operation, will not make a noise like the coiled spring, and is less expensive to manufacture.

In connection with the spring-bar E and strap *c*, secured to the opposite ends of the rectangular frame C, said frame is supported or held over the axle *a* by a yoke, *d*, secured to the under side of the car-frame.

I have stated that the spring-bar E could be connected to the frame C in any suitable or convenient manner. I prefer, however, to attach it by means of a shackle, *d'*, so as to admit of the frame C having a free movement in all directions.

The U-shaped pawl D has its bearings in the sides of the rectangular frame C, and is provided at one side with a weighted lever, F, said lever having attached thereto a chain, strap, or other flexible connection, *e*, which passes under the car frame or platform, up through the forward end thereof, the purpose of which is to take the U-shaped pawl D off the ratchet-wheel B, and so hold it disengaged with the ratchet-wheel. This is necessary when the starter at the opposite end of the car is in use and the horses drawing from that end, the strap, chain, or connection *e* being fastened to the dash-board of the car by any suitable means, thus preventing any accident from the pawl D engaging with the ratchet-wheel B.

To the opposite side of the frame C is pivoted a weighted lever, G, and to this lever is attached a chain, leather strap, or other flexible connection, *f*, which passes up through a loop, *g*, secured to the side of the frame C and connected to the projecting end of the pawl D.

The strap *e* is pivoted to the end of the sliding draft-bar H, which moves in guides *h*, rigidly secured to the under side of the car frame or platform A. This draw-bar H has an elongated slot, *i*, and a stop, *k*, projecting from the under side of the car-frame into said slot, prevents the draw-bar from being pulled too far in either direction.

A weighted dog, I, is pivoted to the front of the car-frame, and by suitable connection, *l*, is secured to the brake-rod J. Thus the hooked end of the weighted dog is caused to be engaged or disengaged with a hole or notch, *m*, in the draw-bar.

The draw-bar H, upon its under face, has one or more notches, *n*, as illustrated in Fig. 4 of the drawings. Sometimes when the starter is let back and the car stopped it may stand on a downgrade, and the purpose of these notches is to hold the draw-bar H, and prevent it from going back should a slight draft be given by the team.

To further explain the advantages of the notches *n*, which are in form similar to ratchet-teeth, when the bar H is drawn out by a slight draft a sufficient distance to bring the first notch *n* to engage with the end of the weighted dog I, said dog will hold or retain the draw-bar in that extended position until another slight draft draws the bar out to bring the next notch in line to engage with the dog, which retains the draw-bar thus extended as before, and so on until the bar is drawn out its full extent, when the dog will engage with the opening or notch *m* in the side of the draw-bar, and in the rear of the notches *n*. Of course, when the car is standing in a position that it requires much of any draft to start it, the bar H will be at once drawn out its full extent, and the notches therein will slip by the end of the weighted dog as the bar is being drawn out until the notch *m* registers with the end of the weighted dog, when the latter will hold the bar in an extended position. The object of these notches *n* is to prevent the draw-bar H from going back after the bar has been partially drawn out, thereby taking the pawl D of the ratchet-wheel B, in order to prevent any rattling or noise when the draw-bar is only partially drawn out, this being considered of importance to the successful running of the car. As the bar H is being drawn out the rectangular frame C is brought forward and the weighted lever G caused to assume an upright position, which by the connection *f* elevates or raises the U-shaped pawl D off the ratchet-wheel B.

Now, when the car is stopped the weighted dog I is made to disengage with the notch *m* in the draw-bar H, when the spring-bar E carries the frame C back. As this is being effected the backward movement of the frame C crowds the long weighted lever G up on the axle *a* and loosens the strap *f*, the weighted lever F on the opposite side of the frame A bringing the U-shaped pawl D in contact with the teeth upon the ratchet-wheel B.

When the car is started and the bar H drawn out the weighted lever G is taken off the axle *a*, and that being the heaviest and most powerful of the two weighted levers, the resistance of the lever F is overcome, and the lever G causes the pawl D to be thrown up and off the ratchet-wheel and holds it in that position while the car is in motion.

It will be seen that there are no attachments or connections to the car-axle except the ratchet-wheel, and therefore the mechanism can be readily applied to any of the street-cars now in use without injury thereto, or in any manner changing its construction or marring its appearance.

Horse-cars frequently vary in space from the ground to the axle, and in such cases all that will be required is to change the size of the ratchet-wheel so that it will not interfere with the bottom of the car and regulate the length of the U-shaped pawl to correspond; otherwise there will be no material change required in the several operating parts of the starter.

Having now fully described my invention, what I claim as new, and desire to secure by Letters Patent, is—

1. In a car-starter, the axle *a*, having rigidly connected thereto the ratchet-wheel B, in combination with the U-shaped weighted pawl D, having the flexible connection *e*, and the weighted lever G, pivoted to the frame C and connected to the pawl by strap or chain *f*, substantially as and for the purpose set forth.

2. In a car-starter, the ratchet-wheel B, connected to the axle *a*, in combination with the suspended frame C, weighted levers F G, and pawl D, substantially as and for the purpose specified.

3. The pawl D and weighted levers F G, in combination with the frame C, spring-bar E, and ratchet-wheel B, substantially as and for the purpose described.

4. The combination, with the frame C, carrying the weighted pawl D and weighted lever G, of the draw-bar H, having hole *m* and one or more notches, *n*, and the weighted dog I, said draw-bar being connected to the frame by strap *c*, substantially as and for the purpose specified.

In testimony that I claim the above I have hereunto subscribed my name in the presence of two witnesses.

ROBERT HERMANCE.

Witnesses:
ISAAC PETIT,
ABRAM BRISTOL.